US012346208B2

(12) United States Patent
Sarkar

(10) Patent No.: US 12,346,208 B2
(45) Date of Patent: Jul. 1, 2025

(54) SERVER GROUP FETCH IN DATABASE BACKUP

(71) Applicant: Rubrik, Inc., Palo Alto, CA (US)

(72) Inventor: Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 30 days.

(21) Appl. No.: 17/486,552

(22) Filed: Sep. 27, 2021

(65) Prior Publication Data

US 2023/0095814 A1    Mar. 30, 2023

(51) Int. Cl.
G06F 11/14 (2006.01)
G06F 16/16 (2019.01)

(52) U.S. Cl.
CPC ...... *G06F 11/1451* (2013.01); *G06F 11/1464* (2013.01); *G06F 16/16* (2019.01); *G06F 2201/84* (2013.01)

(58) Field of Classification Search
CPC .. G06F 11/1451; G06F 16/16; G06F 11/1464; G06F 2201/84
See application file for complete search history.

(56) References Cited

U.S. PATENT DOCUMENTS

| 6,480,904 | B1 | 11/2002 | Kato et al. |
| 10,146,629 | B1 | 12/2018 | Yadav et al. |
| 11,032,156 | B1 | 6/2021 | Jain et al. |
| 11,567,871 | B2 * | 1/2023 | Allu ..................... G06F 12/0848 |
| 2010/0100698 | A1 * | 4/2010 | Yang ..................... G06F 11/1451 |
| | | | 711/E12.103 |
| 2012/0017214 | A1 * | 1/2012 | Shannon ............. G06F 9/30134 |
| | | | 718/100 |
| 2014/0136708 | A1 * | 5/2014 | Dees, Jr. ............... G06F 9/5072 |
| | | | 709/226 |
| 2014/0229628 | A1 * | 8/2014 | Mandal ............. G06F 16/24573 |
| | | | 709/231 |
| 2015/0278328 | A1 * | 10/2015 | Honsowetz ........... G06F 16/285 |
| | | | 707/739 |
| 2020/0034245 | A1 | 1/2020 | Kohler |
| 2021/0263779 | A1 * | 8/2021 | Haghighat ............ G06F 9/5061 |
| 2022/0214998 | A1 * | 7/2022 | Mutnuru ............. G06F 9/44505 |
| 2023/0096071 | A1 | 3/2023 | Sarkar |

OTHER PUBLICATIONS

U.S. Appl. No. 17/486,256, filed Sep. 27, 2021, Scalable Group Backup in Relational Databases.

* cited by examiner

Primary Examiner — Tony Wu
(74) Attorney, Agent, or Firm — Holland & Hart LLP

(57) ABSTRACT

In some examples, a method of performing a backup of a group of relational databases comprises identifying database files to be fetched in the group of relational databases; grouping the identified database files into batches; based on configuration parameters of the identified database files, identifying, among the batches, a sub-set of batches of database files that are eligible to be fetched in parallel for the backup; configuring a single fetch call to a call stack to fetch the sub-set of eligible batches; and determining a push or pull model for the configured single fetch call based at least in part on feedback from a most resource-constrained element in the call stack.

20 Claims, 14 Drawing Sheets

SERVER GROUP FETCH IN DATABASE BACKUP

TECHNICAL FIELD

The present disclosure relates generally to systems and methods for server group fetch in database backup applications, and in some examples to server database scalability.

BACKGROUND

The volume and complexity of data that is collected, analyzed, and stored are increasing rapidly over time. Malware, such as ransomware, is becoming increasingly prevalent. The computer infrastructure used to handle these challenges is also becoming more complex, with more processing power and more portability. As a result, data management, online security, and data backup are becoming increasingly important.

In this environment, the number of databases needing backup and protection can grow exponentially across a great number of hosts. It is not uncommon to see servers hosting thousands of databases. Performing a group or batch backup of this population of databases is slow and not scalable using conventional tools.

SUMMARY

In some examples, a backup system comprises at least one processor, and a memory storing instructions which, when executed by the at least one processor among the processors, cause the system to perform operations in a method of performing a backup of a group of relational databases, the operations comprising: identifying database files to be fetched in the group of relational databases; grouping the identified database files into batches; based on configuration parameters of the identified database files, identifying, among the batches, a sub-set of batches of database files that are eligible to be fetched in parallel for the backup; configuring a single fetch call to a call stack to fetch the sub-set of eligible batches; and determining a push or pull model for the configured single fetch call based at least in part on feedback from a most resource-constrained element in the call stack.

In some examples, the operations further comprise splitting database files in the sub-set of eligible batches into data chunks; and eliminating one or more data chunks from the configured single fetch call.

In some examples, eliminating one or more data chunks from the configured single fetch call is based at least in part on a changed-block-tracking (CBT) analysis.

In some examples, the operations further comprise reading the database files in the sub-set of batches in parallel and transmitting database file data and metadata to a patch file server.

In some examples, reading the database files in parallel includes allocating a same amount of read buffer per file.

In some examples, the patch file server is located on a data node in a cluster of cooperating data nodes.

In some examples, the operations further comprise generating a snapshot based on data or metadata of a patch file hosted at the patch file server.

BRIEF DESCRIPTION OF THE DRAWINGS

Some embodiments are illustrated by way of example and not limitation in the views of the accompanying drawing.

DETAILED DESCRIPTION

Figure 1A:
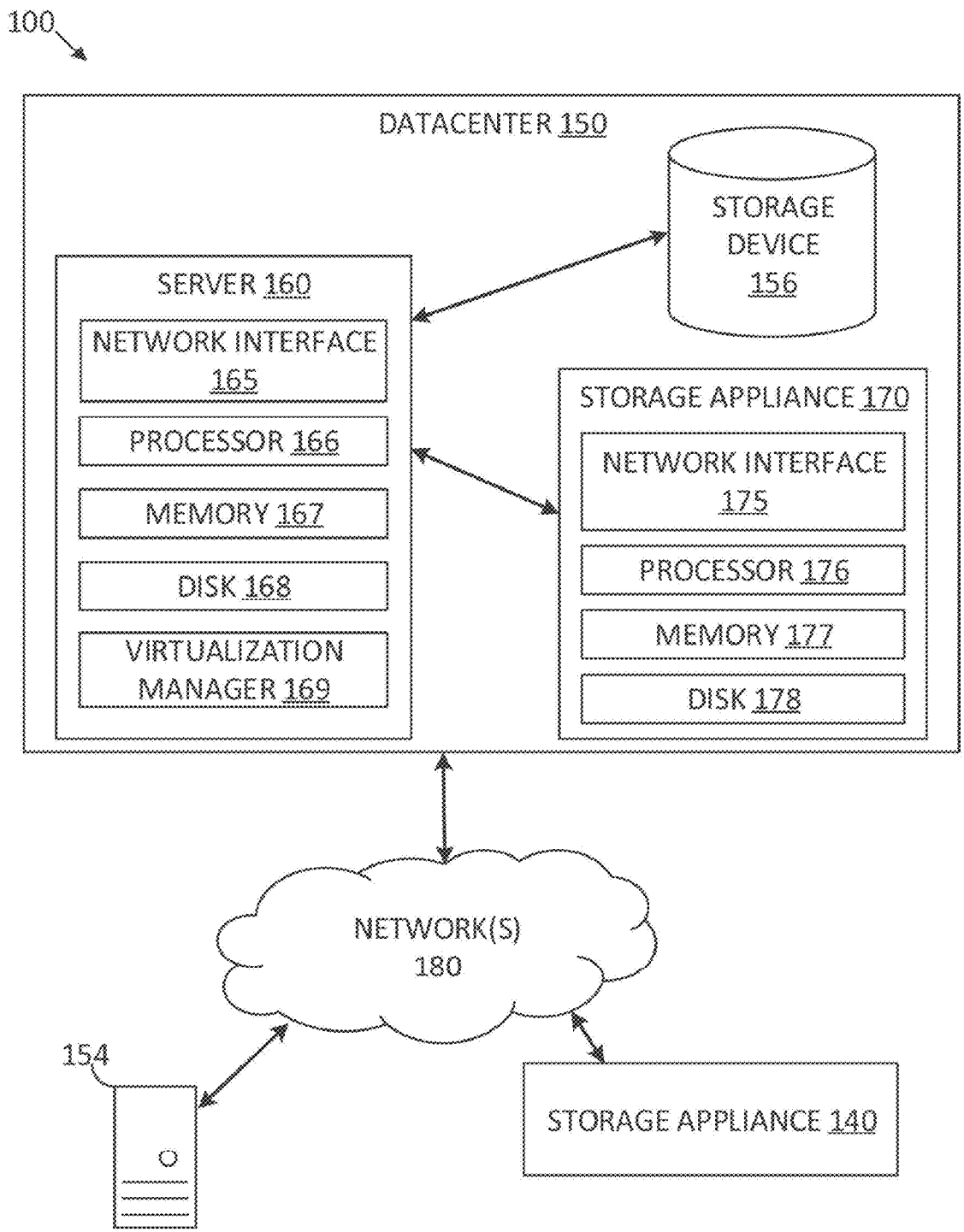
FIG. 1A is a block diagram illustrating an example networked computing environment in which some embodiments described herein are practiced.

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

It will be appreciated that some of the examples disclosed herein are described in the context of virtual machines that are backed up by using base and incremental snapshots, for example. This should not necessarily be regarded as limiting of the disclosures. The disclosures, systems, and methods described herein apply not only to virtual machines of all types that run a file system (for example), but also to networked-attached storage (NAS) devices, physical machines (for example Linux servers), and databases.

In some respects, this disclosure relates to the field of "group" or "batch" backup. Challenging issues can arise in this field when seeking to back up or protect a great number (for example, thousands) of databases such as relational databases, hosted one or more servers. An SQL database is an example of a relational database. Other examples are possible. Over time, a population of databases needing backup protection can grow exponentially across a great number of server hosts. It is therefore not uncommon to see servers with thousands of databases per host. It will be appreciated that, in the nature of being relational, these types of databases in particular can each possess a multiplicity of inter-relationships or "dependencies". This issue can present a significant problem for data management platforms and/or backup service providers because performing a batch backup of all these inter-related databases is not scalable using a conventional tools.

In some present examples, a snapshot writer is provided that enables "scalable" functionality. In some examples, the snapshot writer is specially configured to work efficiently in a complex relational database environment of the type described above. In one aspect, the snapshot writer service is able to freeze and unfreeze IO's going into and out of the databases and, in another aspect, identify backup operations (for example, read/parse data) that can be performed in parallel. Parallel-operation opportunities can be strongly dependent on the complexity and number of the dependencies in and among the relational databases. Example backup operations or complexities may include determining database dependencies, optimizing an order of operations, sequencing of operations, determining parallel operations, and freezing and unfreezing IOs or data.

Parallel-operation identification is not a trivial matter in an environment comprising many thousands of databases such as relational databases for example. Each database may have its own specific internal dependencies (especially if it is a relational database), and external dependencies with other databases, for example how the databases interact with one another). Based on identified dependencies, examples of the snapshot writer service determine operations that can be performed in parallel. Some examples can also generate an order of operations including parallel and non-parallel operations. In some examples, non-parallel operations include operations that can only be performed in sequence, or serially. In some examples, the determination of parallel and non-parallel operations is known as a "decomposition" operation.

In some examples, to enhance scalability and speed of batch backups, a parallel "grouped push model" in a batch backup system is provided. In some examples, the backup system resides within a data management system 102, described further below. In some examples, the backup system can perform the following operations. In a first "batch" phase, database files to be fetched are split into batches in a layer, such as a Job Fetcher Loop (JFL) layer. Based on database and/or file configuration parameters, a subset of batches is identified to proceed in parallel. In some examples, this parallel batch identification may be based on or include a decomposition operation. Further phases may include a chunking (or splitting) phase, a fetch phase, a metadata phase, and a finalization phase. These phases are described further below.

In some examples, in the fetch phase, a call scheduling overhead is determined. The call scheduling overhead includes a number of scheduling units. The number of scheduling units is reduced by grouping files to be fetched into a configured single call across all elements in an entire call stack, instead of one call per file. Another aspect includes a real-time determination of whether to use a push or pull model for the single fetch call. In some examples of the backup system, this determination is relegated to the most resource constrained element in the call stack. In example situations, this constrained resource may be best placed to make a local decision as to how best to drive network and disk utilization to the maximum, or at least optimize network and disk utilization, given its resource constraints.

Various embodiments described herein thus relate generally to systems and methods for performing a backup of a group of relational databases in a scalable manner.

In some embodiments, data and/or metadata of a distributed file system is stored in a consistent, snapshottable distributed database. In some examples, the term "snapshottable" in relation to a distributed database means the distributed database is capable of being captured or backed up in one or more snapshots. In some examples, the term "snappable" in relation to an object, such as a file, means the object (e.g., the file) is capable of being captured or backed up in one or more snapshots. Each snapshot of a distributed file system is stored in one or more files in the distributed file system. In some embodiments, part of the snapshot is saved implicitly in a data layout on the hard disks or solid-state drives (SSDs) (e.g., chunk generation, filenames), and part of it is saved in the distributed database.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1A is a block diagram illustrating one embodiment of a networked computing environment 100 in which some embodiments are practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a SSD, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application, or a web server. The storage device 156 may include one or more hardware storage devices for storing data, such as a hard disk drive (HDD), a magnetic tape drive, a SSD, a storage area network (SAN) storage device, or a NAS device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167. Processor 166 may include one or more processing units or processing devices, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface (GUI)) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, a management system provides management of one or more clusters of nodes as described herein, such as management of one or more policies with respect to the one or more dusters of nodes. The management system can serve as a cluster manager for one or more clusters of nodes (e.g., present in the networked computing environment 100). According to various embodiments, the management system 190 provides for central management of policies (e.g., SLAs) that remotely manages and synchronizes policy definitions with clusters of nodes. For some embodiments, the management system facilitates automatic setup of secure communication channels between clusters of nodes to facilitate replication of data. Additionally, for some embodiments, the management system manages archival settings for one or more clusters of nodes with respect to cloud-based data storage resource provided by one or more cloud service provider.

Figure 1B:
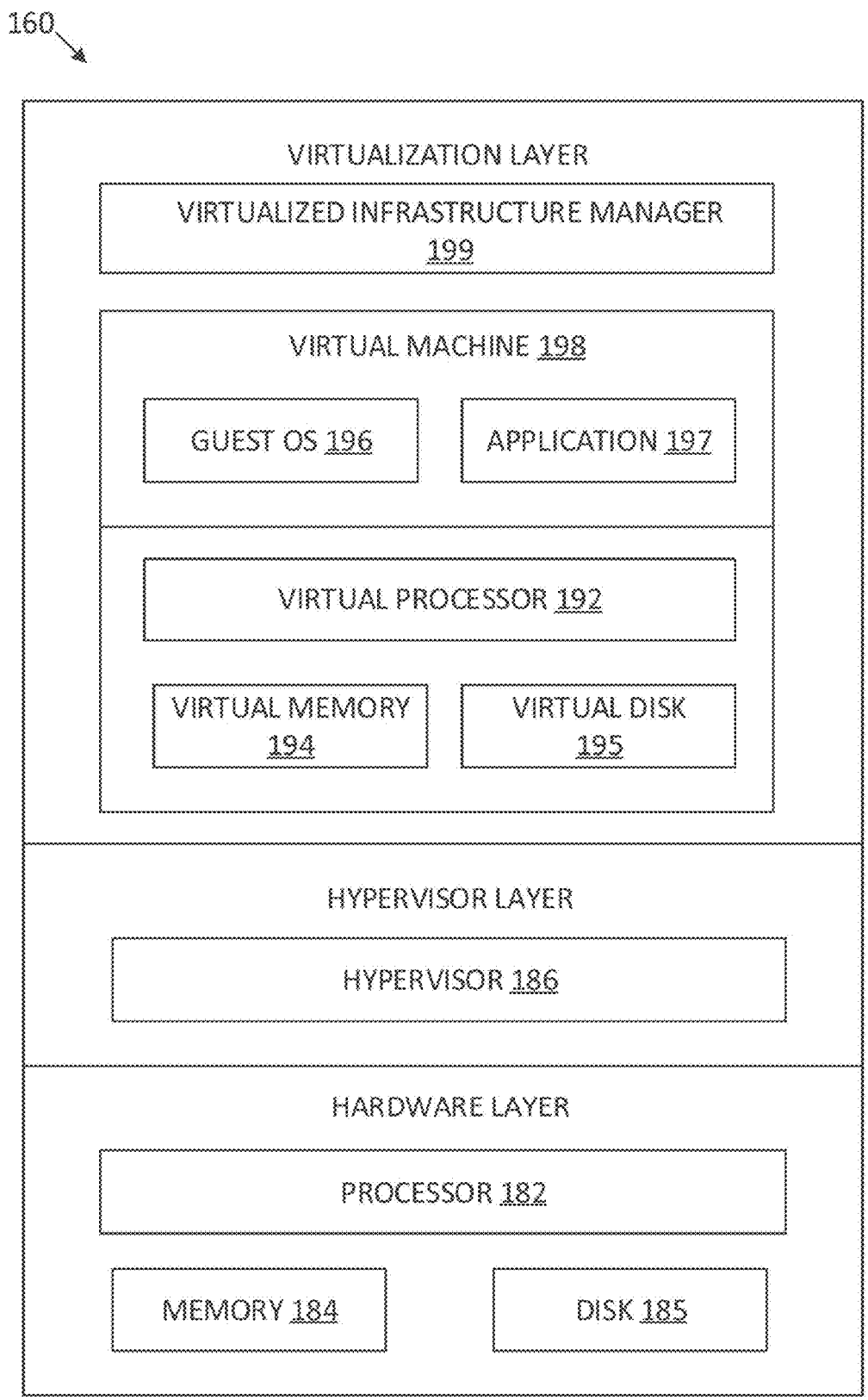
FIG. 1B is a block diagram illustrating one embodiment of a server in the example networked computing environment of FIG. 1A.

FIG. 1B is a block diagram illustrating one embodiment of server 160 in FIG. 1A. The server 160 may comprise one server out of a plurality of servers that are networked together within a data center. In one example, the plurality of servers may be positioned within one or more server racks within the data center 150. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as NFS. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
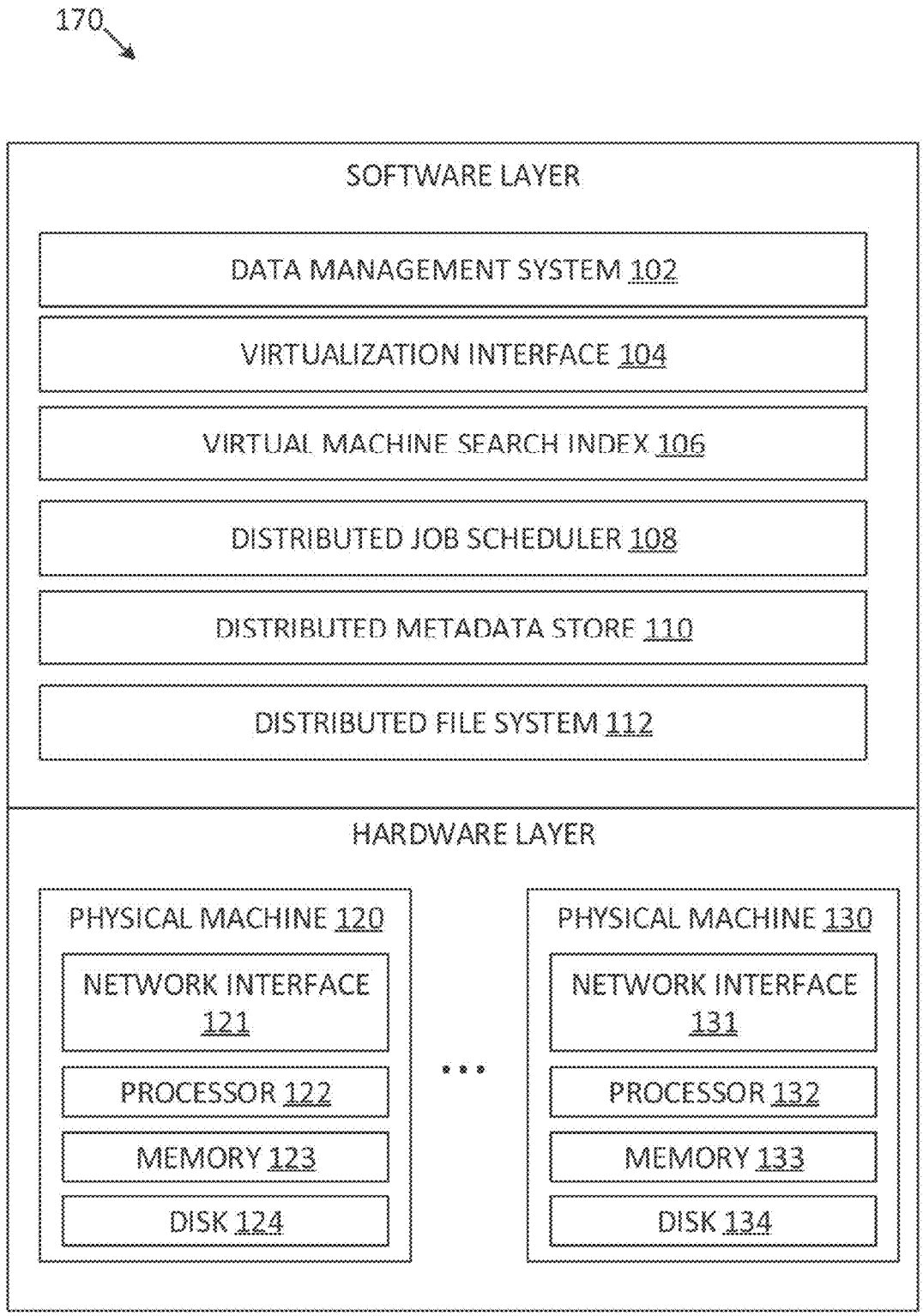
FIG. 1C is a block diagram illustrating one embodiment of a storage appliance in the example networked computing environment of FIG. 1A.

FIG. 1C is a block diagram illustrating one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include an HDD and/or an SSD. In some cases, disk 134 may include a flash-based SSD or a hybrid HDD/SSD drive. In one embodiment, the storage appliance 170 may include a plurality of physical machines arranged in a cluster (e.g., eight machines in a cluster), Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NTS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon, A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file.

In some embodiments, the data management system 102 resides inside the distributed file system 112. The data management system 102 may receive requests to capture snapshots of the entire distributed file system 112, on a periodic basis based on internal protocols, or upon occurrence of user triggered events.

The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incremental snapshots derived from the single full image snapshot. The single full image snapshot of the virtual machine may be stored using a first storage device of a first type (e.g., an HDD) and the one or more incrementals derived from the single full image snapshot may be stored using a second storage device of a second type (e.g., an SSD). In this case, only a single full image needs to be stored and each version of the virtual machine may be generated from the single full image, or the single full image combined with a subset of the one or more incrementals. Furthermore, each version of the virtual machine may be generated by performing a sequential read from the first storage device (e.g., reading a single file from an HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise the highest-level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
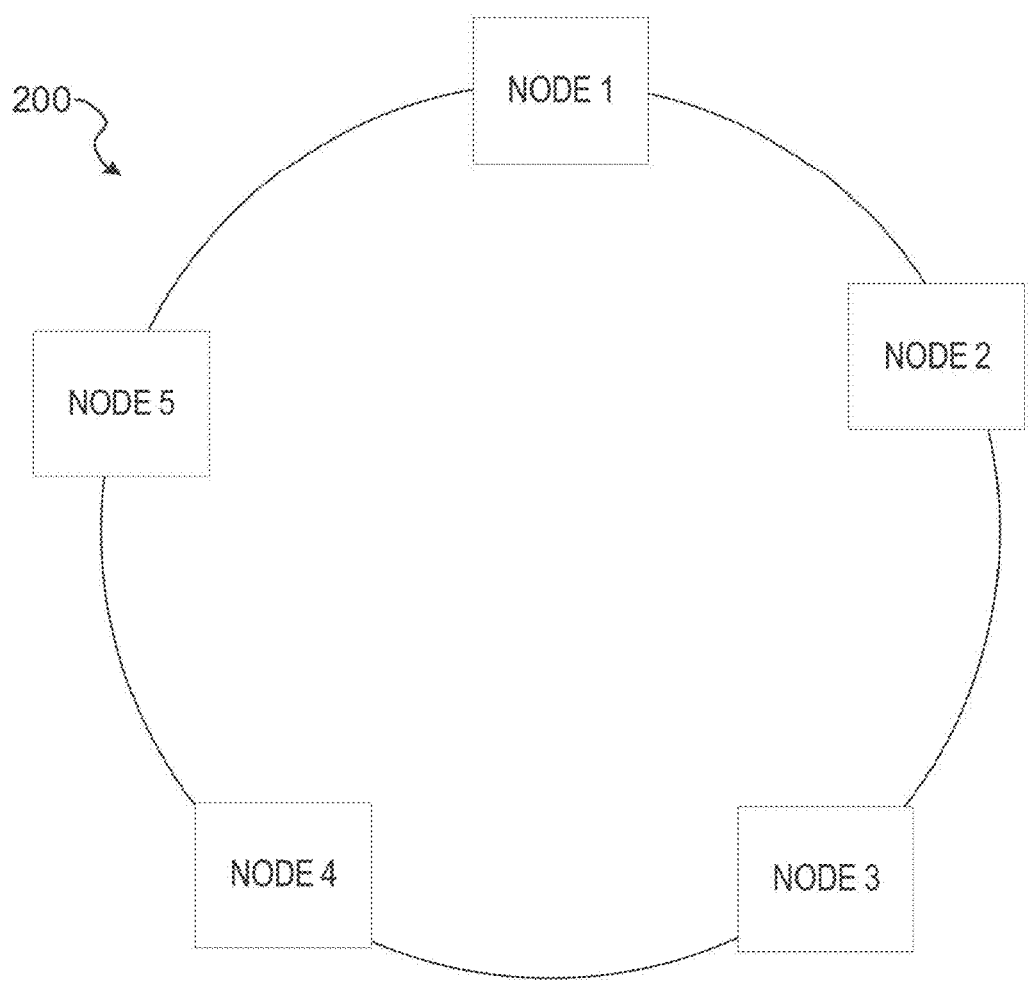
FIG. 2 is a block diagram illustrating an example duster of a distributed decentralized database, according to some example embodiments.

FIG. 2 is a block diagram illustrating an example cluster 200 of a distributed decentralized database, according to some example embodiments. As illustrated, the example cluster 200 includes five nodes, nodes 1-5. In some example embodiments, each of the five nodes runs from different machines, such as physical machine 130 in FIG. 1C or virtual machine 198 in FIG. 1B. The nodes in the example cluster 200 can include instances of peer nodes of a distributed database cluster-based database, distributed decentralized database management system, an SQL database, a NoSQL database, Apache Cassandra, DataStax, MongoDB, CouchDB), according to some example embodiments. The distributed database system is distributed in that data is sharded or distributed across the example cluster 200 in shards or chunks and decentralized in that there is no central storage device and no single point of failure. The system operates under an assumption that multiple nodes may go down, up, become non-responsive, and so on. Sharding is splitting up of the data horizontally and managing each shard separately on different nodes. For example, if the data managed by the example cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 200. For example, data written to node 1 can be replicated to nodes 2 and 3. If node 1 prematurely terminates, node 2 and/or 3 can be used to provide the replicated data. In some example embodiments, each node of example cluster 200 frequently exchanges state information about itself and other nodes across the example cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically-partitioned and replicated throughout the example cluster 200.

Reading: Any node of example cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 200 are configured to function the same way (e.g., as symmetrical peer database nodes that communicate via gossip protocol, such as Cassandra nodes) with no single point of failure. If one of the nodes in example cluster 200 terminates prematurely ("goes down"), another node can rapidly take the place of the terminated node without disrupting service. The example cluster 200 can be a container for a keyspace, which is a container for data in the distributed decentralized database system (e.g., whereas a database is a container for containers in conventional relational databases, the Cassandra keyspace is a container for a Cassandra database system).

Some examples of a data management system, such as the data management system 102 above, include cloud data management (CDM) and backup capabilities. Examples below are described in that context. Some examples include onsite data management and backup and other capabilities. In either situation, group backup and restore performance can degrade significantly when a large number of databases requiring backup exist on one or many more hosts. In some instances, processing time and effort is wasted because metadata is gathered in relation to all the databases on the hosts, not just those that have been selected or require a backup. In being blind to the identity of the databases involved and the true ambit of a group backup task, the metadata gathering may be rendered unhelpfully independent of the number of databases that actually require backup. In some examples, operations are proportional to the number of databases being backed up. In some examples, the number of threads required is the same as the number of databases being backed up. In some examples, a database backup system gathers metadata about the database backup set only.

Some examples include pre-snapshot activities, such as freezing each database in the database backup set and gathering, in a frozen state, information about each database in the database backup set. This information may be used in the restore path. Example operations include take a snapshot of the volumes in which the relevant databases are resident. Example post-snapshot activities include thaw (unfreezing) every database in the database backup set and may include performing post-snapshot accounting such as populating database backup tables. Some examples take care to preserve certain behaviors of conventional previous mechanisms to maintain backwards compatibility.

In some examples, the above actions require synchronization with a snapshot service. To this end, some examples include an ephemeral snapshot writer. In some examples, the snapshot writer is active only during the duration of the database snapshot. In other words, the snapshot writer is instantiated for every snapshot job and is destroyed when the snapshot operation terminates. The snapshot writer is therefore not installed, nor is it visible to a user and is therefore automatically upgraded any time the backup system or agent is updated, Some examples include instantiating an ephemeral snapshot writer to perform at least one of the backup operations, the snapshot writer being destroyed or deleted when the at least one backup operation terminates.

Figure 3:
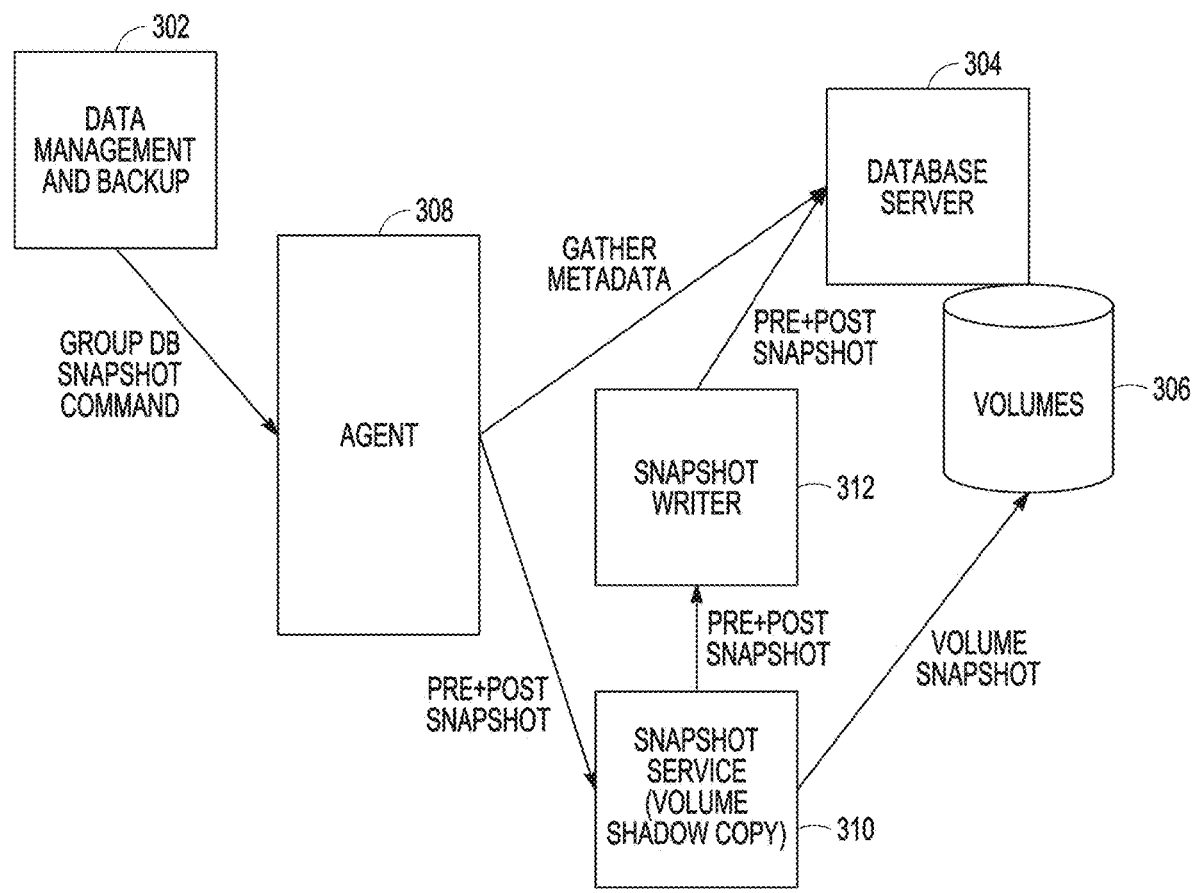
FIG. 3 is a block diagram illustrating an example component architecture, according to some example embodiments.

With reference to FIG. 3, an example component architecture is shown. The architecture includes a CDM data management and backup system 302, for example the data management system 102 described further above. A server 304 hosts a large group of databases, in this example, relational databases in volumes 306. The volumes include a database backup set, i.e., a specific group of databases, among all the hosted databases, scheduled for a backup under a Service Level Agreement (SLA), for example.

In a group backup operation, an agent 308 gathers metadata about the database backup set and performs post-snapshot accounting, for example at a volume shadow copy at a snapshot service 310. A snapshot writer 312 performs pre- and post-snapshot activities, for example freezing IOs flowing into and out of the database backup set, gathering database data and/or metadata while in a frozen state, and unfreezing the database set. The database data and/or metadata are used to determine aspects such as database dependencies, and to identify parallel and non-parallel backup operations, for example as described further below. During the group backup operation, the snapshot service 310 takes one or more snapshots of the volumes 306 in which the database backup sets reside.

Figure 4A:
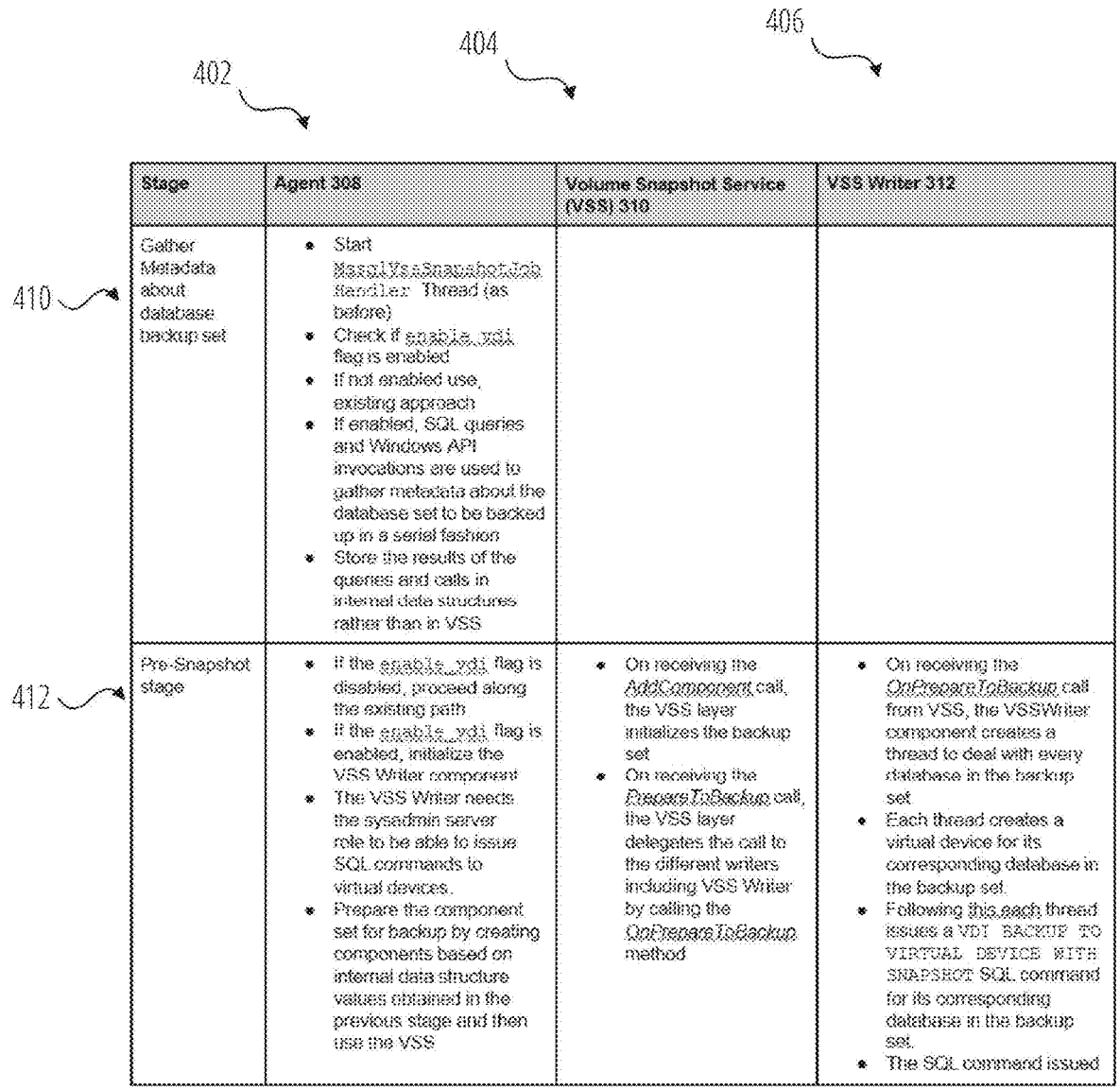
FIGS. 4A-4C are flow charts depicting stages and operations included in a decomposition operation, according to some examples.
Figure 4B:
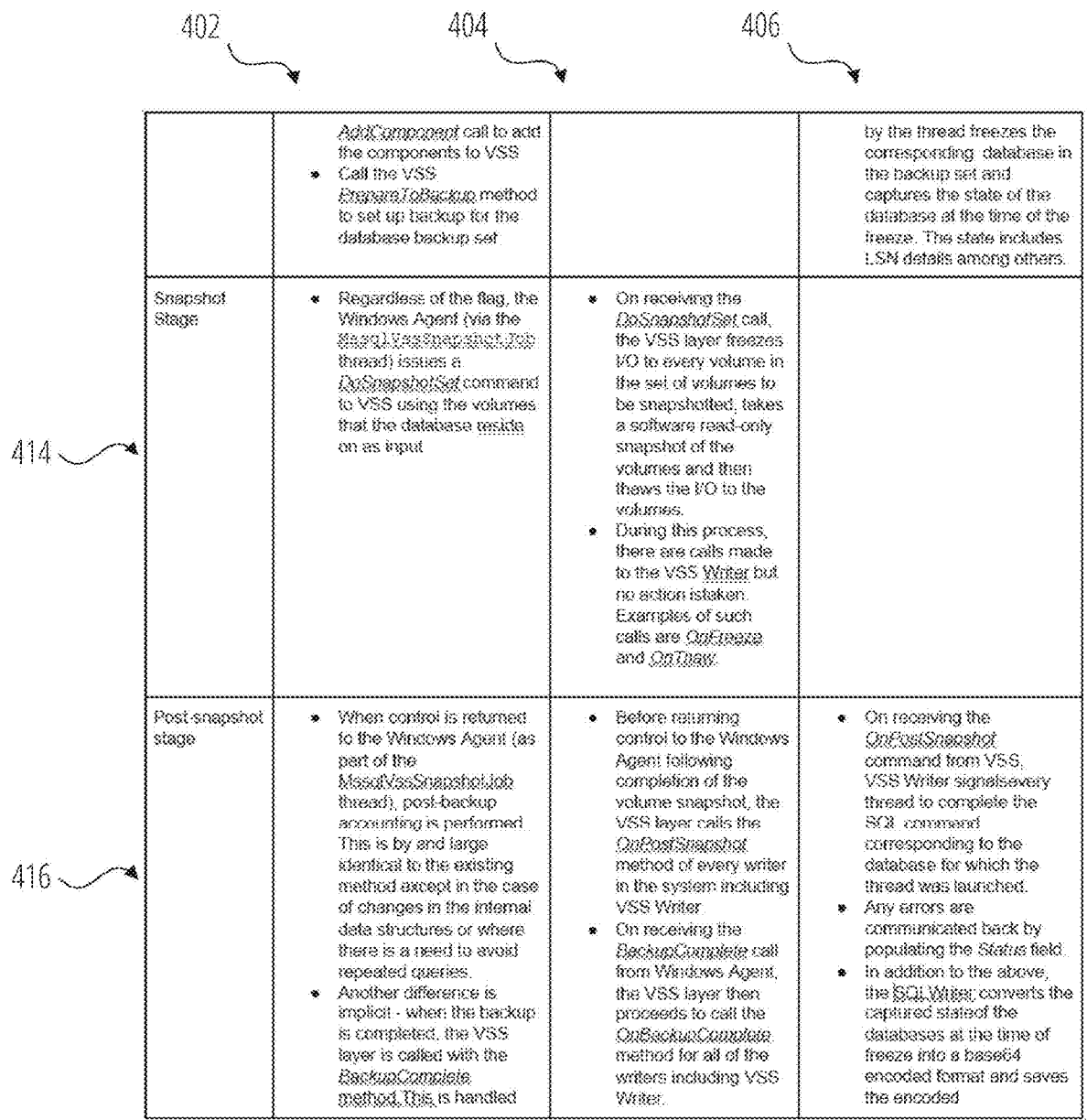
Figure 4C:
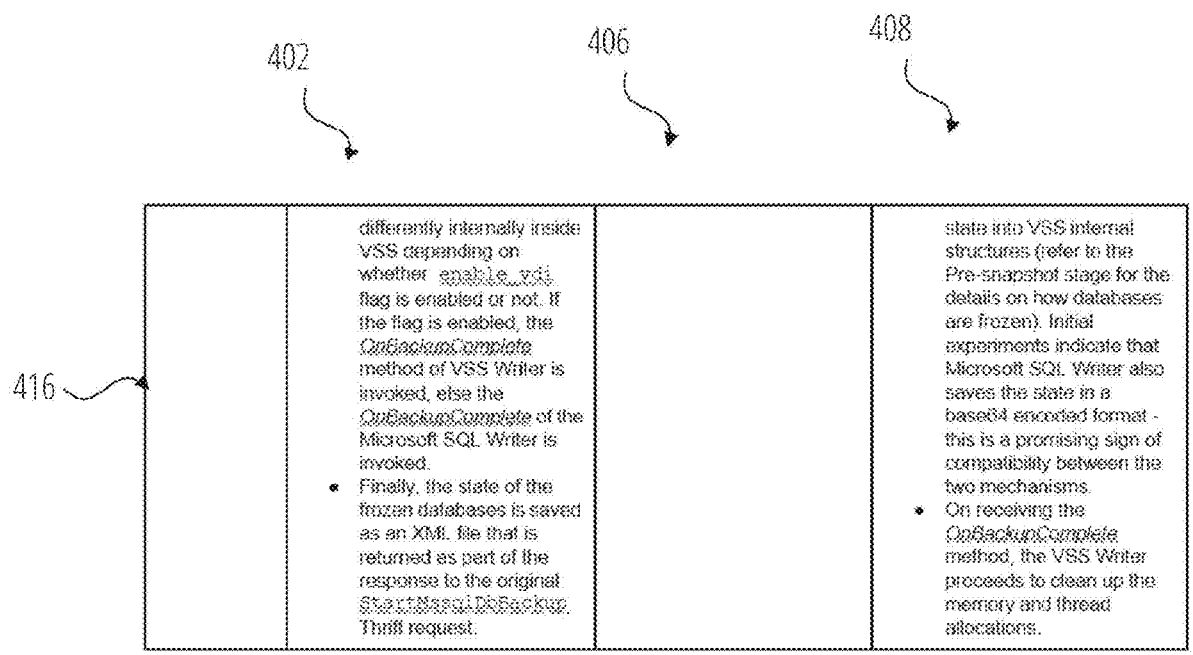

Some examples of component flows are shown in more detail in FIGS. 4A-4C. A respective "swim lane" 402, 404, and 406 is provided for each of the illustrated components including the agent, the snapshot service 310, and the snapshot writer 312. In the views, the snapshot service 310 is referred to as a volume snapshot service (VSS) by way of example. The snapshot writer 312 is referred to as a VSS writer 312, accordingly, simply by way of example. Each swim lane includes operations relating to a stage 410 of gathering data and/or metadata of a database backup set, a pre-snapshot stage 412, a snapshot stage 414, and a post-snapshot stage 416.

In some examples, the provision of a snapshot writer 312 disables or replaces an existing or conventional snapshot writer. Some examples therefore include a restore mechanism that can duplicate (mimic) conventional restore functionality without incurring further performance overhead. In some examples, replacement restore functionality is invoked by a software trigger or flag, failing which existing or conventional restore flow is executed.

Figure 5A:
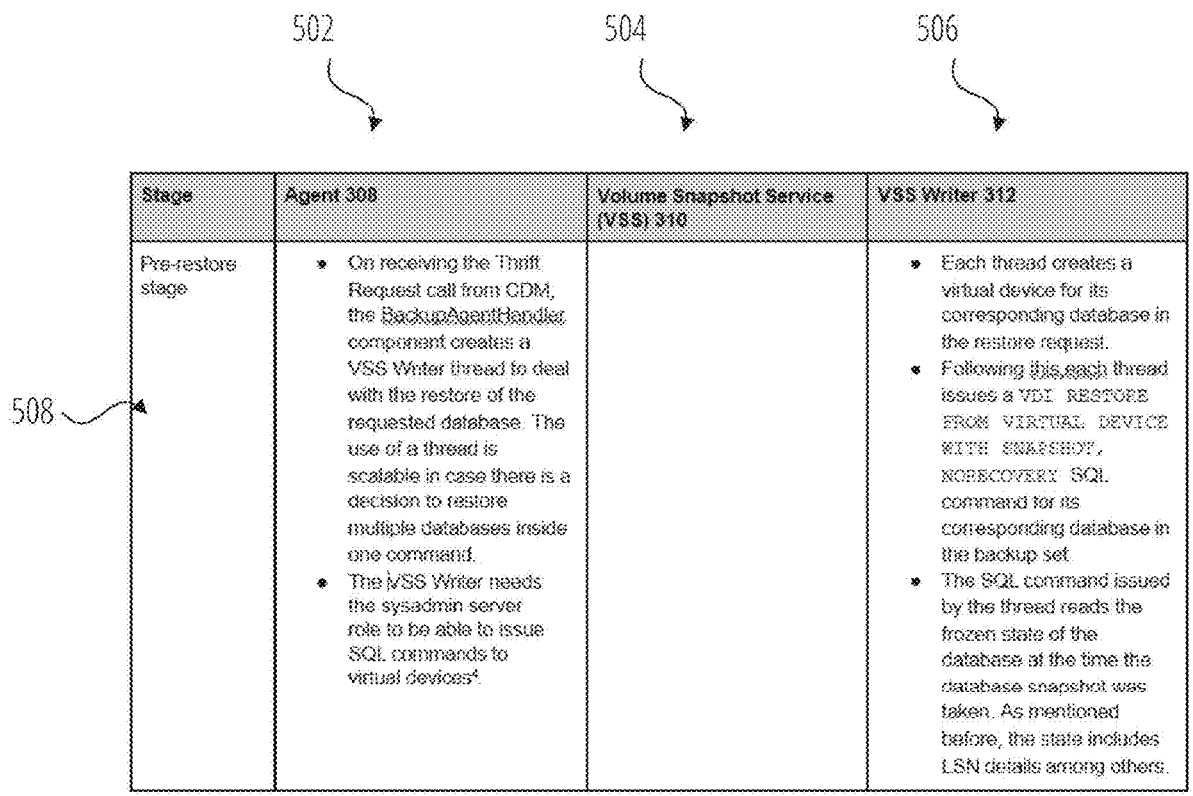
FIGS. 5A-5B are flow charts depicting stages and operations in a restore method, according to some examples.
Figure 5B:
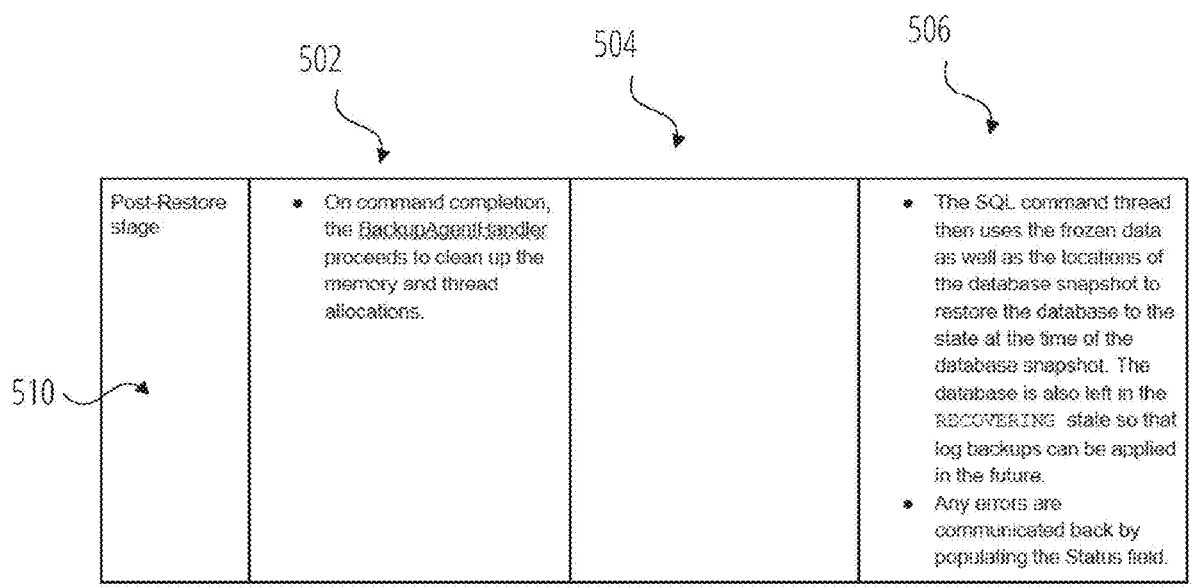

In this regard, an example component flow of a replacement restore mechanism is shown in FIGS. 5A-5B. As before, a respective "swim lane" 502, 504, and 506 is provided for each of the listed example components including the agent 308, the snapshot service 310, and the snapshot writer 312. These components are referred to in the same way as FIGS. 4A-4C. Each swim lane includes operations relating to a pre-restore stage 508 and a post-restore stage 510.

With reference to the terminology used in FIGS. 4A-4C and FIGS. 5A-5B, in some examples a BackupComplete is an event indicating that a backup has completed. A Backup Components Document is an XML document created by the snapshot service in the course of a backup operation. A DoSnapshotSet is a snapshot service operation that takes the actual snapshot of volumes in the system. A freeze is a period of time during a shadow copy creation process (including taking a snapshot for example) when all writers have flushed their writes to the volumes and are not initiating additional writes. Also, a snapshot service event may indicate that a shadow copy freeze is in progress. A GatherWriterMetadata is a snapshot service event indicating that metadata to be gathered about the system and its various components (such as databases) has been completed. A PostSnapshot is a snapshot service event indicating that a shadow copy has been completed (for example, see the volume shadow copy, FIG. 3). A PrepareForBackup is a snapshot service event indicating that a backup operation is about to take place. A PrepareForSnapshot is a snapshot service event indicating that writers should initialize for an upcoming shadow copy operation. A thaw (or unfreeze) is a snapshot service event issued by the snapshot service indicating that a shadow copy freeze has completed. It may be used to remove a writer's preparations (initializations) for a freeze. A VDI is a virtual device interface (VDI) and in some examples includes a backup API that provides high online backup throughput with minimal degradation to transaction workloads, and fast restore times. A volume is a logical storage unit. In some examples, a volume is the target of shadow copy creation operations.

Some examples of a backup system include a revised library for submitting commands to the snapshot writer 312. This library may be convenient for multi-threaded or parallel invocations, for example. In some examples, group (batch) backup configuration and salient information is stored in a metadata store. In some examples, batch backup configuration data is indexed by a job instance ID and a snappable ID, and event information is indexed by a job instance ID and an event series ID. In some examples, this data is created or used by a "parent" (or oversight) job that creates batch backup jobs and cleans up (for example, performs accounting and checks data) once a batch backup job is completed.

One possibility for improving scalability in batch backup operations is to increase component or call parallelism to maximize or optimize resource utilization. Parallelism does not, however, necessarily solve scheduling issues per se—in fact, increased parallelism may make per-thread scheduling latencies worse if a given backup system already has issues scheduling with parallelism from default configuration parameters. One way some examples deal with scheduling overhead is to reduce the scheduling units. This may be achieved by grouping the files to be fetched in a single call, for example a Thrift Remote Procedure Call (RPC) instead of one call per file, as is conventional in some arrangements. In some examples, groups of files are fetched in a single call across an entire call stack from a JFL to an agent server to a third-party agent, as described more fully below. A second aspect includes a determination of whether a pull or a push model is used for the call.

In a pull model, a data management node, for example one of the data nodes 1-5 in the node cluster of FIG. 2, decides to fetch the data from a third-party agent. One advantage of pull systems is that they allow a distribution of work to those nodes that can process it. A node only requests work if the node has resource capacity, and if one node gets blocked for some reason, work will automatically be distributed to the nodes that still have enough reserve resource capacity. This generally maximizes scalability for a given amount of computing resources in terms of CPU, disk, and memory resources.

However, one drawback of a pull model is that the number of computing resources may be relatively scarce. This implies that a given node may be conservative in fetching file chunks from a server to avoid taking up too much memory on a host, particularly if file chunks are being fetched in parallel from the same host. In a push model, on the other hand, a third-party agent pushes data to the node (for example one of nodes 1-5 in the node cluster of FIG. 2). Since the decision making is relegated to the most resource constrained element in the stack, the third-party agent is able to make a local decision as to how best to drive network and disk utilization to the maximum, or at least optimize it, given the resource constraints. In some examples, a pull model may be limited to conservative request patterns which incur a higher scheduling overhead and lower resource utilization (for example, network or disk) while a push model maximizes resource utilization with the minimum scheduling overhead.

Figure 6:
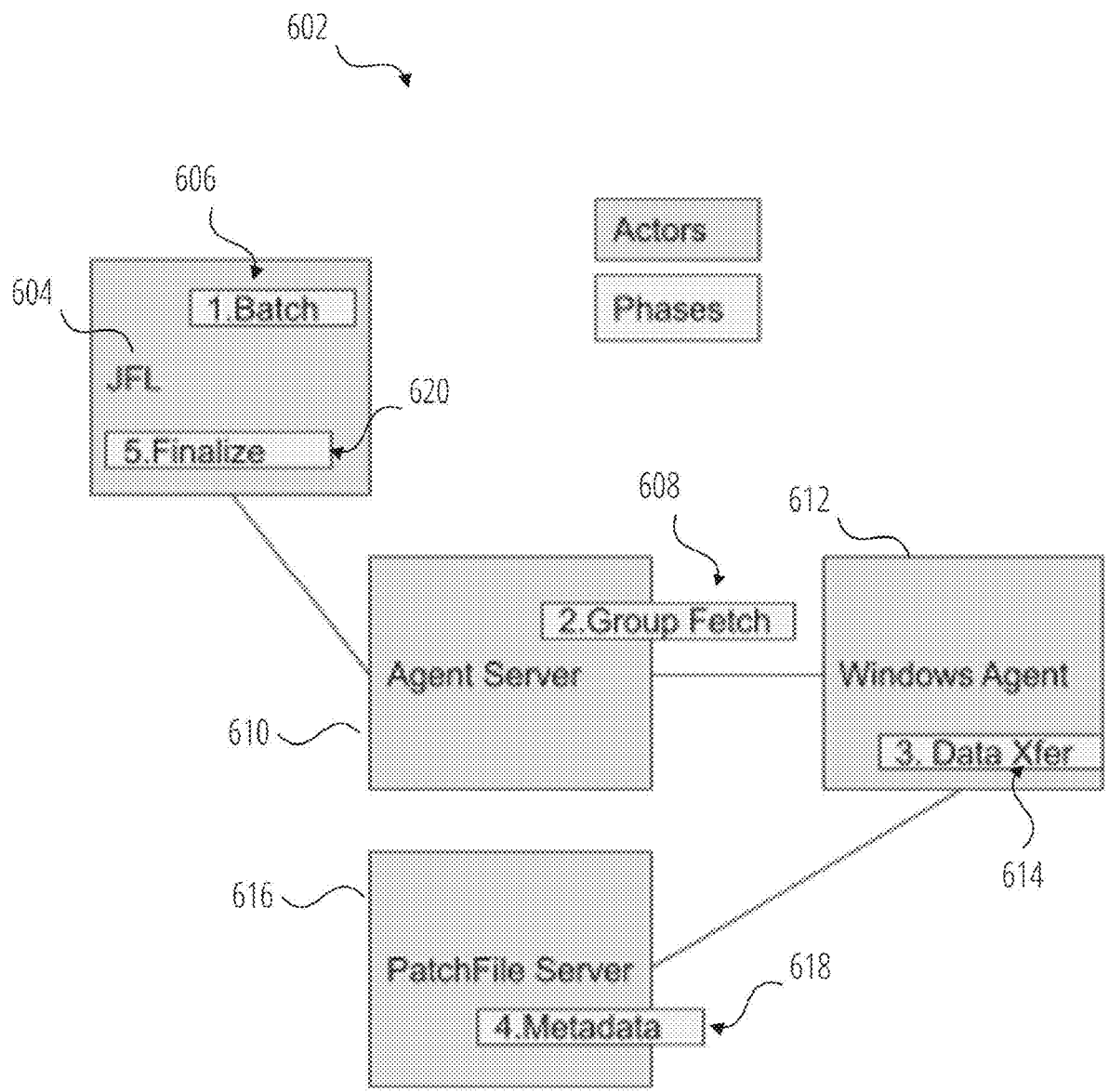
FIG. 6 includes a general architecture and operations of a backup system, according to an example embodiment.

With reference to FIG. 6, a general architecture, and operations in a backup system 602 are now described. The figure includes example actors (system components) and phases (operations). Other arrangements are possible in which one or more different actors perform one or more of the illustrated phases. In some examples, the system architecture is based on principles that include a grouping of multiple individual file fetches into a single group file fetch, and a parallel (or grouped) push model of transferring data from a third-party agent to a data node.

In a batch phase 606 performed by a JFL 604, database files to be fetched as art of backup operations are split into batches in a single job. The execution of the job may require a job execution framework in a data node cluster, for example in a data management system 102 described above. Based on file or batch configuration parameters, a subset of batches is identified to be processed or fetched, in parallel. In a group fetch phase 608 performed by an agent server 610, for each batch, a RPC command is sent to a third-party agent 612. In a data transfer phase 614 performed by the third-party agent 612, on receiving the RPC command, the third-party agent 612 commences reading database files in parallel by allocating a fixed amount of read buffer per file. When the read buffers are full, the data is transferred with associated metadata to a patch file server 616 in a node in a data node cluster (for example, one of the cluster of nodes in FIG. 2, for example hosted in a data management system 102). The number of files read, as well as the amount of read buffers per file, is controlled by the configuration parameters. The default values of these configuration parameters are determined empirically in some examples by observing CPU, memory and disk usage in large scale runs. The default values of these configuration parameters ensure that an aggressive level of parallelism does not impact the performance of any server in production mode.

In a metadata processing phase 618 performed by the patch file server 616, as the data arrives in the receiving data node, a patch file is created and updated with the arriving data. When all the data has arrived for a given file, the patch file is finalized, and patch file statistics are generated. In some examples, the statistics are returned to the JFL 604 via the third-party agent 612 and the agent server 610. In a finalization phase 620 performed by the JFL 604, when the JFL 604 receives the patch file statistics for all the files for all databases in a batch, the patch file metadata is also finalized and snapshots are generated.

In some examples, the JFL 604 includes a JFL invocation method that is enabled when the configuration toggle for the fetch for a group of files is toggled. The set of databases to be backed is, or has previously been, split up into batches and each method invocation works on a single batch. The method then creates a thread pool with the number of threads set to a desired level of parallelism which may be based on a configuration parameter maxDataStreams. Each thread proceeds to create patch file structures, for example in a blob storage using a beginCreate call. Once all the threads have completed execution, then an API call is made to the AgentServer (for example agent server 610, FIG. 6) to request the contents of the list of files for all databases in the batch with their respective patch file metadata structures. When the API call returns, the status of each individual file fetch as well as the status of the overall group fetch is checked for error handling. For every successful individual file fetch, the patch file is validated with the fingerprint file to check for integrity. Finally, a portion of the fetched file is mounted and checked for application-level consistency.

In some examples, the agent server 610 acts as a funnel between the job execution framework and the third-party agent 612. In some examples, the agent server 610 receives a request and relays the request to the third-party agent 612. On receipt of the response from the third-party agent 612, the agent server 610 relays the response to the job execution framework. In some examples, there is no significant functionality in the agent server 610 other than providing secure communication with the third-party agent 612. Nevertheless, in some examples, an important function of the agent server can include loading fingerprints for the file to be fetched so that repeated blocks are not fetched.

In some examples, the third-party agent 612 includes a handler which processes incoming requests from the agent server 610. The handler takes the request and then proceeds to take a series of steps to transfer data to the patch file server 616 and return patch file statistics back to the agent server 610 upon successful completion of the data transfer. In some examples, the third-party agent performs the following operations in order to fulfill the requirements.

Initially, a third-party agent is instructed to set up a secure communication channels with the patch file server 616 on a specified node in a node cluster (for example one of the nodes of FIG. 2 in a data management system 102). Example security mechanisms invoked may include self-signed certificates without hostname validation when connecting to the patch file server 616. In a further operation, a thread pool is configured with a number of threads equal to the maxDataStreams configuration parameter discussed above, Each thread is assigned to a file in the list of files in the RPC call. The thread then computes the extents to be read for the file. If fingerprints are available for previous versions of a file, then the unmodified extents are filtered out of the extents using fingerprints and only modified extents are read for the file. The thread then reads a subset of the extents the size of which is defined, in some examples, by configuration parameters.

In some examples, an important consideration in establishing the two configuration parameters can include determining an amount of memory to be allocated for each RPC call. This amount of memory is a product of the two configuration parameters. In other words, the memory amount can be derived by a multiplication of the number of RPC calls that can proceed in parallel and is indicated by a configuration parameter.

In some examples, a pattern of communication is established as follows. When a given file is read for the first time, a patch file is opened on the patch file server 616. As extents are read, the data is transferred to the patch file server 616 where the data is appended to the patch file. When all the extents have been read, the patch file is finalized and patch file statistics are returned to the third-party agent 612 thread. The thread then posts the exit status back to the third-party agent discussed above along with associated patch file statistics. The third-party agent continues until all files in the request are read, aggregates all the responses and sends the response back to the agent server 610.

In some examples, the patch file server 616 provides an API interface for clients to create patch files directly on a data node cluster (for example the cluster of FIG. 2). This allows clients to asynchronously create patch files as data is read by the third-party agent 612. In some examples, the patch file server 616 does not perform error handling. If an error is returned to the job execution framework, a rollback method can clean up any patch file remnants or errors.

Figure 7:
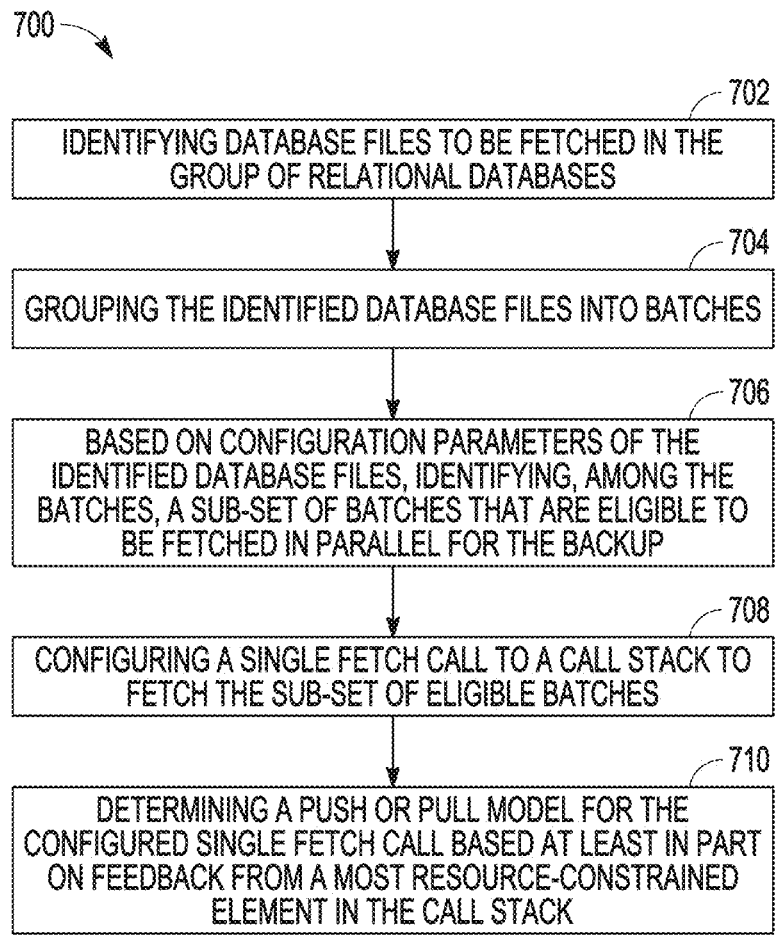
FIG. 7 is a flow chart depicting operations in a method of backup of a group of relational databases, according to an example.

Some embodiments herein include methods. With reference to FIG. 7, example operations in a method 700 of performing a backup of a group of relational databases comprise: at operation 702, identifying database files to be fetched in the group of relational databases; at operation 704, grouping the identified database files into batches; at operation 706, based on configuration parameters of the identified database files, identifying, among the batches, a sub-set of batches that are eligible to be fetched in parallel for the backup; at operation 708, configuring a single fetch call to a call stack to fetch the sub-set of eligible batches; and, at operation 710, determining a push or pull model for the configured single fetch call based at least in part on feedback from a most resource-constrained element in the call stack.

In some examples, the method 700 further comprises splitting database files in the sub-set of eligible batches into data chunks; and eliminating one or more data chunks from the configured single fetch call.

In some examples, eliminating one or more data chunks from the configured single fetch call is based at least in part on a changed-block-tracking (CBT) analysis.

In some examples, the method 700 further comprises reading the database files in the sub-set of batches in parallel and transmitting database file data and metadata to a patch file server.

In some examples, reading the database files in parallel includes allocating a same amount of read buffer per file.

In some examples, the patch file server is located on a data node in a cluster of cooperating data nodes.

In some examples, the method 700 further comprises generating a snapshot based on data or metadata of a patch file hosted at the patch file server.

In some examples, a non-transitory machine-readable medium includes instructions which, when read by a machine, cause a machine to perform operations in a method of performing a backup of a group of relational databases, the operations comprising at least those summarized above, or described elsewhere herein.

Figure 8:
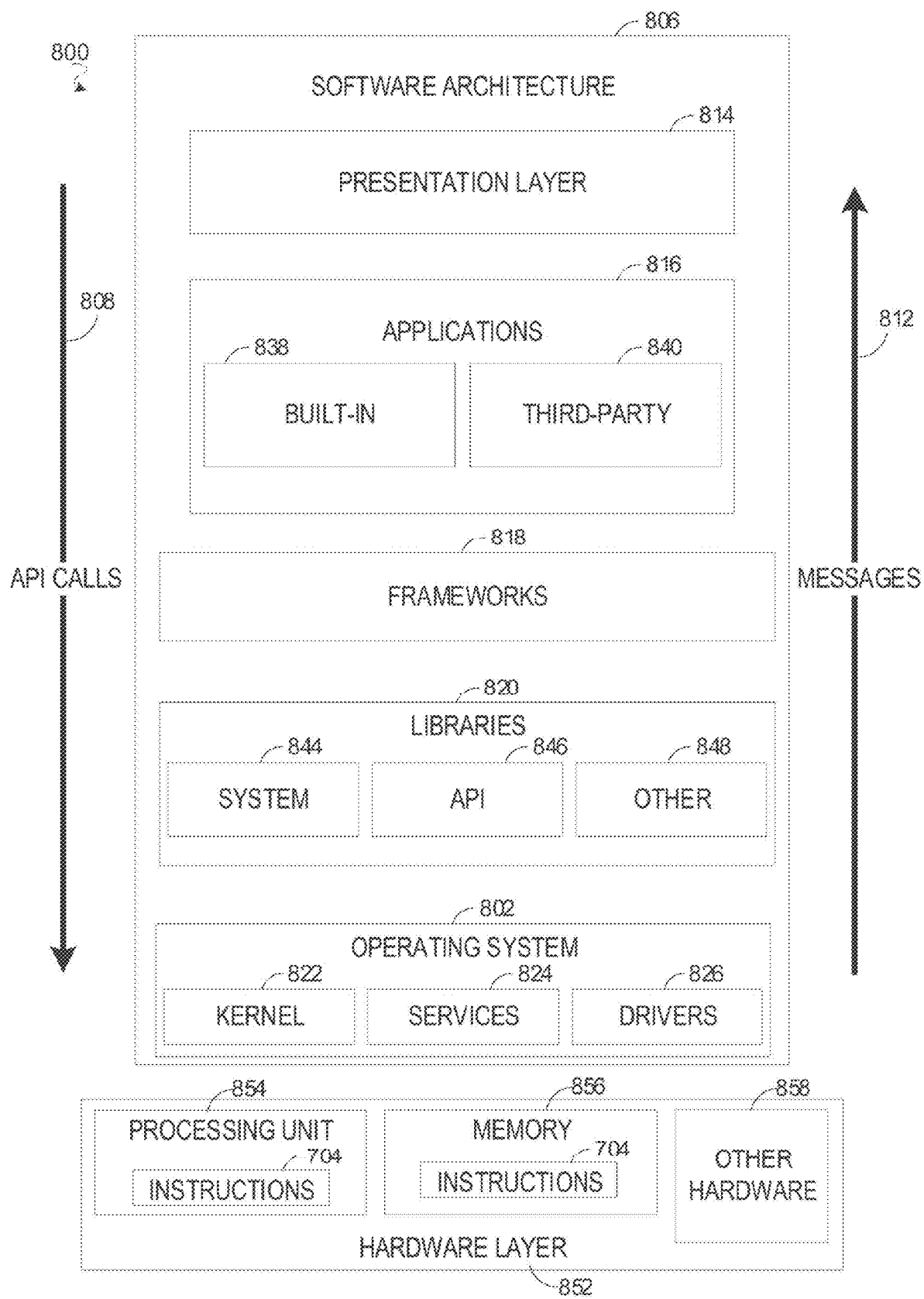
FIG. 8 is a block diagram illustrating an example architecture of software, that can be used to implement various embodiments described herein.

FIG. 8 is a block diagram 800 illustrating an example architecture 806 of software that can be used to implement various embodiments described herein. FIG. 8 is merely a non-limiting example of a software architecture, and it will be appreciated that many other architectures can be implemented to facilitate the functionality described herein. In various embodiments, the software is implemented by a hardware layer 852, which includes a processor 854 operating on instructions 804, a memory 856 storing instructions 804, and other hardware 858. For some embodiments, the hardware layer 852 is implemented using a machine 900 of FIG. 9 that includes processors 910, memory 930, and components 950. In this example architecture 806, the software architecture 806 can be conceptualized as a stack of layers where each layer may provide a particular functionality. For example, the software architecture 806 includes layers such as an operating system 802, libraries 820, frameworks 818, and applications 816. Operationally, the applications 816 invoke API calls 808 through the software stack and receive messages 812 in response to the API calls 808, consistent with some embodiments.

In various implementations, the operating system 802 manages hardware resources and provides common services. The operating system 802 includes, for example, a kernel 822, services 824, and drivers 826. The kernel 822 acts as an abstraction layer between the hardware and the other software layers, consistent with some embodiments. For example, the kernel 822 provides memory management, processor management (e.g., scheduling), component management, networking, and security settings, among other functionalities. The services 824 can provide other common services for the other software layers. The drivers 826 are responsible for controlling or interfacing with the underlying hardware, according to some embodiments. For instance, the drivers 826 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 820 provide a low-level common infrastructure utilized by the applications 816. The libraries 820 can include system libraries 844 (e.g., C standard library) that can provide functions such as memory allocation functions, string manipulation functions, mathematic functions, and the like. In addition, the libraries 820 can include API libraries 846 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 820 can also include a wide variety of other libraries 848 to provide many other APIs to the applications 816.

The frameworks 818 provide a high-level common infrastructure that can be utilized by the applications 816, according to some embodiments. For example, the frameworks 818 provide various GUI functions, high-level resource management, high-level location services, and so forth. The frameworks 818 can provide a broad spectrum of other APIs that can be utilized by the applications 816, some of which may be specific to a particular operating system or platform.

In some embodiments, the applications 816 include a built-in application 838 and a broad assortment of other applications such as a third-party application 840. According to some embodiments, the applications 816 are programs that execute functions defined in the programs. Various programming languages can be employed to create one or more of the applications 816, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 808 provided by the operating system 802 to facilitate functionality described herein.

Figure 9:
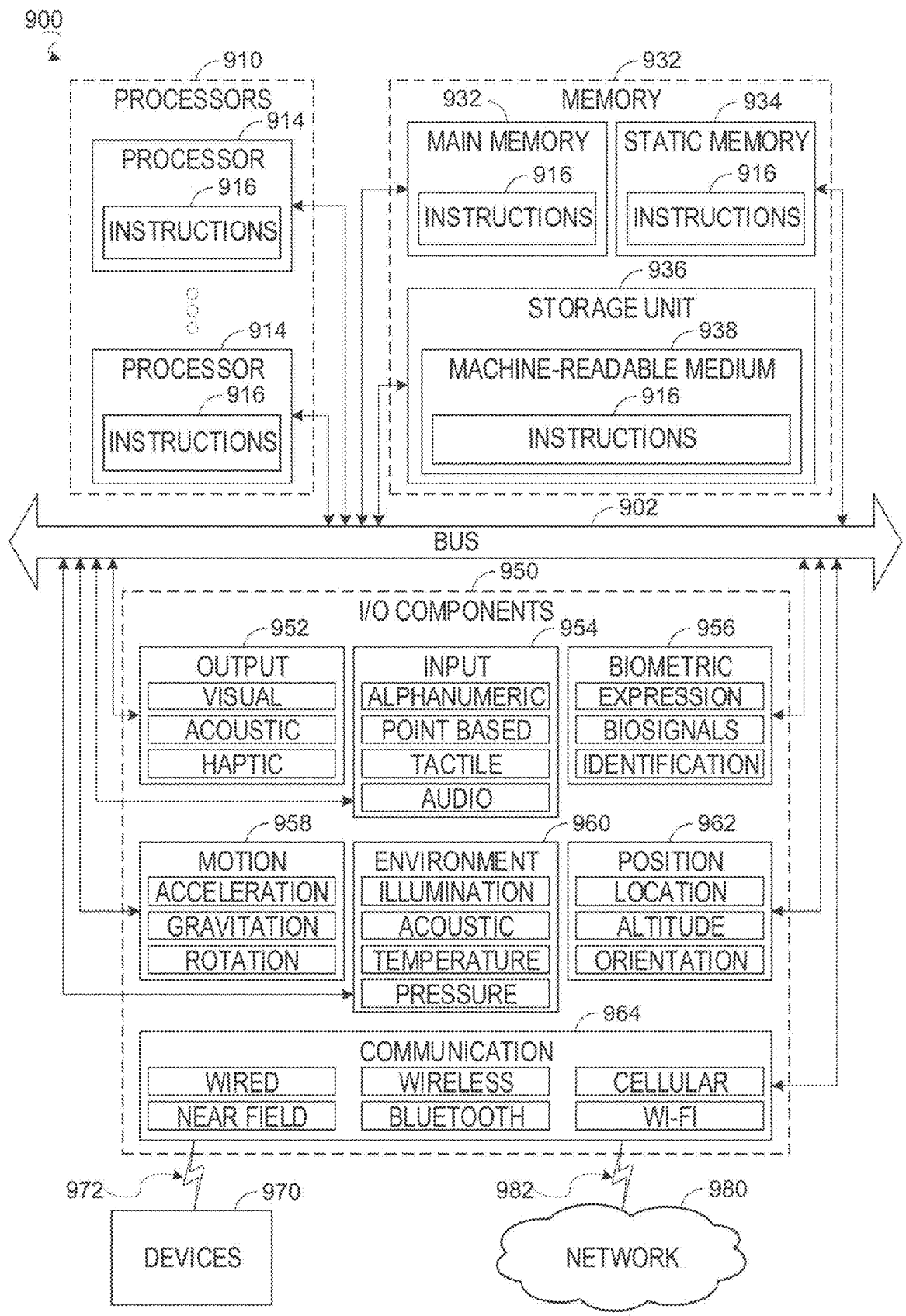
FIG. 9 illustrates a diagrammatic representation of an example machine in the form of a computer system within which a set of instructions may be executed for causing the machine to perform any one or more of the methodologies of various embodiments described herein.

FIG. 9 illustrates a diagrammatic representation of an example machine 900 in the form of a computer system within which a set of instructions may be executed for causing the machine to perform any one or more of the methodologies of various embodiments described herein. Specifically, FIG. 9 shows a diagrammatic representation of the machine 900 in the example form of a computer system, within which instructions 916 (e.g., software, a program, an application, an apple, an app, or other executable code) for causing the machine 900 to perform any one or more of the methodologies discussed herein may be executed. For example, the instructions 916 may cause the machine 900 to execute one of more of the methods disclosed herein. Additionally, or alternatively, the instructions 916 may implement other methods or processes described with reference to FIGS. 4A-4C, FIGS. 5A-5B, and FIG. 7, or as described elsewhere herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In some embodiments, the processors 910 (e.g., a CPU, a Reduced Instruction Set Computing (RISC) processor, a Complex Instruction Set Computing (CISC) processor, a GPU, a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, both accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900. The storage unit 936 can comprise a machine readable medium 938 for storing the instructions 916.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components a physical button, a touch screen that provides location and/or force of touches or touch gestures, or other tactile input components), audio input components (e.g., a microphone), and the like.

In further embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via IP geolocation, location via Wi-Fi® signal triangulation, location via detecting an NFC beacon signal that may indicate a particular location, and so forth.

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), EEPROM, FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Other embodiments can comprise corresponding systems, apparatus, and computer programs recorded on one or more machine readable media, each configured to perform the operations of the methods.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object-oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of performing a backup of a group of relational databases, the method comprising:
   identifying database files to be fetched from the group of relational databases;
   grouping the identified database files into batches;
   based on configuration parameters of the identified database files, identifying, among the batches, a sub-set of batches of database files that are eligible to be fetched in parallel for the backup;
   configuring a single fetch call to a call stack of a data management node, the single fetch call to fetch the sub-set of eligible batches in parallel from the group of relational databases;
   obtaining feedback from an element in the call stack of the data management node, wherein the feedback indicates resource constraints associated with the element;
   determining whether to use a push model or a pull model for execution of the configured single fetch call to fetch the sub-set of eligible batches in parallel based at least in part on the feedback from the element in the call stack of the data management node, wherein both the push model and the pull model are operable to fetch the sub-set of batches of database files from a third-party agent that is separate from the group of relational databases and configured to read database files from the group of relational databases and transfer the database files to a server running on a data management node; and
   executing the configured single fetch call based at least in part on the determined model, wherein:
      when the determined model is the push model, executing the configured single fetch call according to the determined model comprises causing the third-party agent to push the sub-set of batches of database files to the data management node, and
      when the determined model is the pull model, executing the configured single fetch call according to the determined model comprises causing the data management node to pull the sub-set of batches of database files from the third-party agent in accordance with a determination made by the data management node.

2. The method of claim 1, further comprising:
   splitting the database files in the sub-set of eligible batches into data chunks; and
   eliminating a request for one or more data chunks from the configured single fetch call.

3. The method of claim 1, further comprising reading the database files in the sub-set of batches in parallel and transmitting database file data and metadata to a patch file server.

4. The method of claim 2, wherein eliminating the request for one or more data chunks from the configured single fetch call is based at least in part on a changed-block-tracking (CBT) analysis.

5. The method of claim 3, wherein reading the database files in parallel includes allocating a same amount of read buffer per file.

6. The method of claim 3, wherein the patch file server is located on a data node in a cluster of cooperating data nodes.

7. The method of claim 3, further comprising generating a snapshot based on data or metadata of a patch file hosted at the patch file server.

8. A backup system comprising:
   at least one processor; and
   a memory storing instructions which, when executed by the at least one processor, cause the system to perform operations in a method of performing a backup of a group of relational databases, the operations comprising, at least:
      identifying database files to be fetched from the group of relational databases;
      grouping the identified database files into batches;
      based on configuration parameters of the identified database files, identifying, among the batches, a sub-set of batches of database files that are eligible to be fetched in parallel for the backup;
      configuring a single fetch call to a call stack of a data management node, the single fetch call to fetch the sub-set of eligible batches in parallel from the group of relational databases;
      obtaining feedback from an element in the call stack of the data management node, wherein the feedback indicates resource constraints associated with the element;
      determining whether to use a push model or a pull model for execution of the configured single fetch call to fetch the sub-set of eligible batches in parallel based at least in part on the feedback from the element in the call stack of the data management node, wherein both the push model and the pull model are operable to fetch the sub-set of batches of database files from a third-party agent that is separate from the group of relational databases and configured to read database files from the group of relational databases and transfer the database files to a server running on a data management node; and
      executing the configured single fetch call based at least in part on the determined model, wherein:
         when the determined model is the push model, executing the configured single fetch call according to the determined model comprises causing the third-party agent to push the sub-set of batches of database files to the data management node, and
         when the determined model is the pull model, executing the configured single fetch call according to the determined model comprises causing the data management node to pull the sub-set of batches of database files from the third-party agent in accordance with a determination made by the data management node.

9. The system of claim 8, wherein the operations further comprise:
splitting database files in the sub-set of eligible batches into data chunks; and
eliminating one or more data chunks from the configured single fetch call.

10. The system of claim 9, wherein eliminating one or more data chunks from the configured single fetch call is based at least in part on a changed-block-tracking (CBT) analysis.

11. The system of claim 10, wherein the operations further comprise reading the database files in the sub-set of batches in parallel and transmitting database file data and metadata to a patch file server.

12. The system of claim 11, wherein reading the database files in parallel includes allocating a same amount of read buffer per file.

13. The system of claim 11, wherein the patch file server is located on a data node in a cluster of cooperating data nodes.

14. The system of claim 11, wherein the operations further comprise generating a snapshot based on data or metadata of a patch file hosted at the patch file server.

15. A non-transitory machine-readable medium including instructions which, when read by a machine, cause a machine to perform operations in a method of performing a backup of a group of relational databases, the operations comprising, at least:
identifying database files to be fetched from the group of relational databases;
grouping the identified database files into batches;
based on configuration parameters of the identified database files, identifying, among the batches, a sub-set of batches of database files that are eligible to be fetched in parallel for the backup;
configuring a single fetch call to a call stack of a data management node, the single fetch call to fetch the sub-set of eligible batches in parallel from the group of relational databases;
obtaining feedback from an element in the call stack of the data management node, wherein the feedback indicates resource constraints associated with the element;
determining whether to use a push model or a pull model for execution of the configured single fetch call to fetch the sub-set of eligible batches in parallel based at least in part on the feedback from the element in the call stack of the data management node, wherein both the push model and the pull model are operable to fetch the sub-set of batches of database files from a third-party agent that is separate from the group of relational databases and configured to read database files from the group of relational databases and transfer the database files to a server running on a data management node; and
executing the configured single fetch call based at least in part on the determined model, wherein:
when the determined model is the push model, executing the configured single fetch call according to the determined model comprises causing the third-party agent to push the sub-set of batches of database files to the data management node, and
when the determined model is the pull model, executing the configured single fetch call according to the determined model comprises causing the data management node to pull the sub-set of batches of database files from the third-party agent in accordance with a determination made by the data management node.

16. The medium of claim 15, wherein the operations further comprise:
splitting database files in the sub-set of eligible batches into data chunks; and
eliminating one or more data chunks from the configured single fetch call.

17. The medium of claim 15, wherein the operations further comprise reading the database files in the sub-set of batches in parallel and transmitting database file data and metadata to a patch file server.

18. The medium of claim 16, wherein eliminating one or more data chunks from the configured single fetch call is based at least in part on a changed-block-tracking (CBT) analysis.

19. The medium of claim 17, wherein reading the database files in parallel includes allocating a same amount of read buffer per file.

20. The medium of claim 17, wherein the patch file server is located on a data node in a cluster of cooperating data nodes.

* * * * *